United States Patent Office.

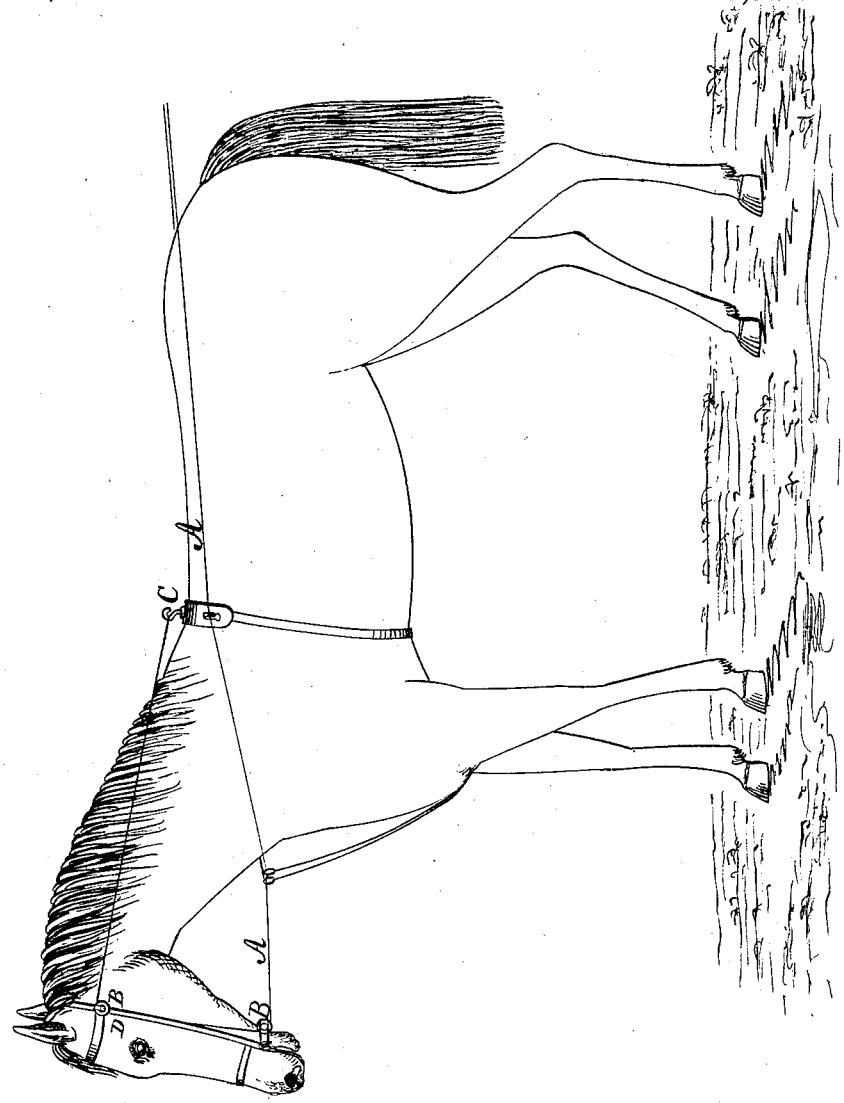

IMPROVEMENT IN HARNESS REINS.

WILLIAM CLARK, OF VALATIE, NEW YORK.

Letters Patent No. 59,819, dated November 20, 1866.

SPECIFICATION.

TO ALL WHOM IT MAY CONCERN:

Be it known that I, Rev. WILLIAM CLARK, of Valatie, in the county of Columbia, and State of New York, have invented a new and useful Improvement in "Harness Reins;" and I do hereby declare that the following is a full, clear, and exact description thereof, which will enable others skilled in the art to make and use the same, reference being had to the accompanying drawings forming part of this specification:

The present invention relates to that class of harness reins which are passed through the bit and gag-rings, or through pulleys hung or attached to them, and thence to the check-hook; and the invention consists in so combining with such reins a stop, whether adjustable or not, as to regulate the amount to which the horse may be checked by drawing or pulling upon the reins, while, at the same time, it will not interfere with the freedom with which horses, having such a system of harness and check-reins, can lower their heads when desiring to drink.

In accompanying plate of drawings my improvement is shown in connection with the figure of a horse.

A, in the drawings, represents the harness reins, which, in addition to being passed through the martingale and turret-rings of the harness, are passed through the bit and gag-rings or pulleys, B, hung or attached thereto, and thence to the check-hook, C, these reins between the bit and gag-rings or pulleys being provided with a collar or ring, D, that acts as a stop or limit to the movement of the reins, through the said rings or the pulleys attached thereto, in such a direction as to obviate all possibility of the horse being checked to such a degree as to injure him, while at the same time it will allow the horse to be sufficiently checked and also permit him to lower his head sufficiently to drink.

This stop, D, may be so attached to the harness reins, if so desired, as to be susceptible of adjustment thereon.

I claim as new, and desire to secure by Letters Patent—

The combination of the stop, D, with the harness reins, A, substantially as and for the purpose described.

WILLIAM CLARK.

Witnesses:
 WILLIAM SPEARS,
 DANIEL AYRAULT.